…

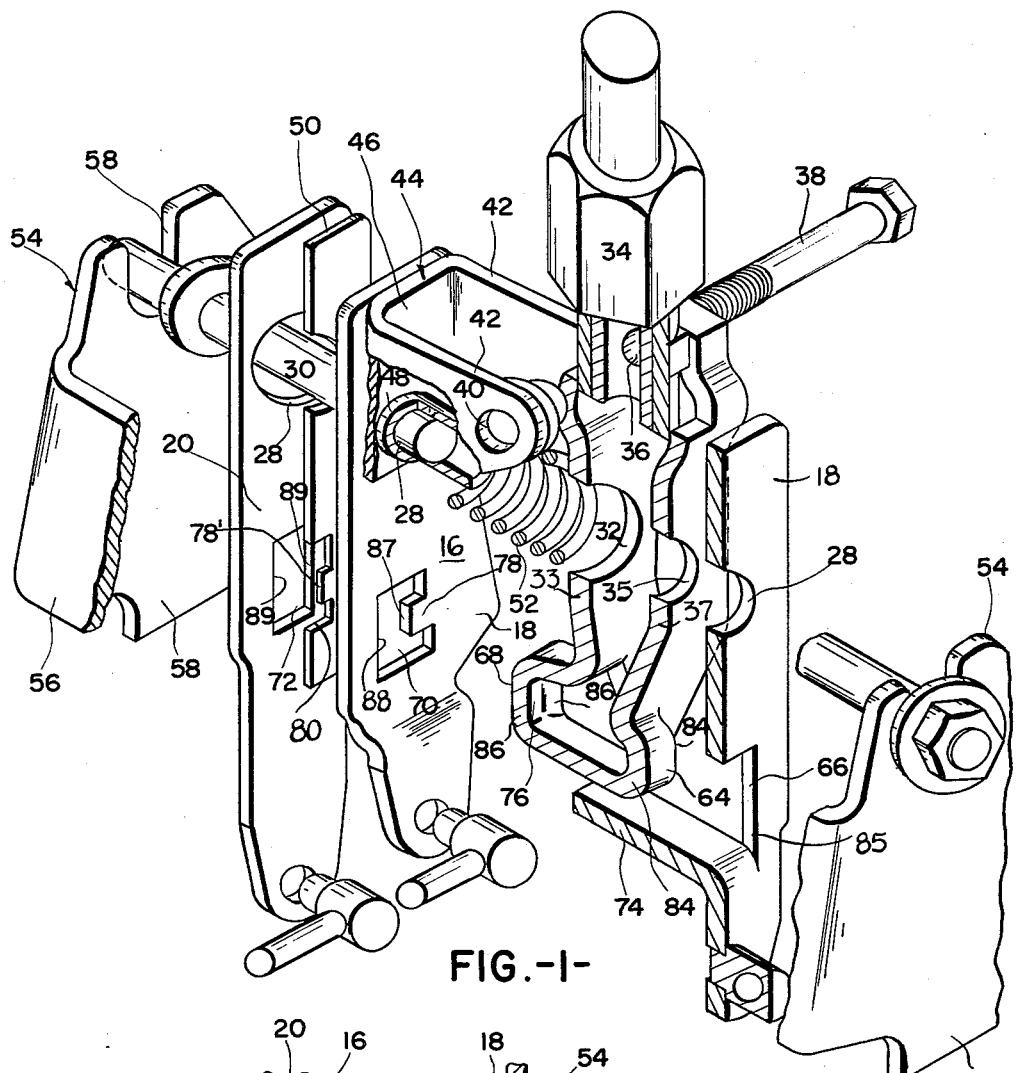
FIG.-1-
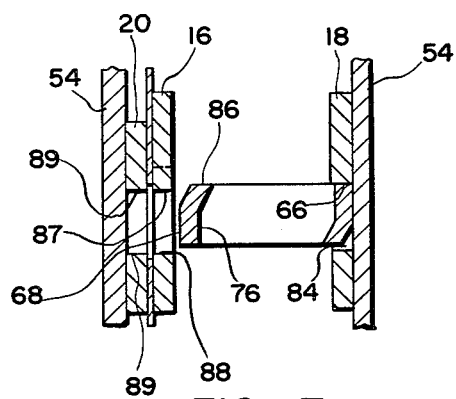
FIG.-7-
INVENTOR.
GEORGE H. HURST JR.
WILLIAM G. CAMPBELL
BY
ATTORNEY

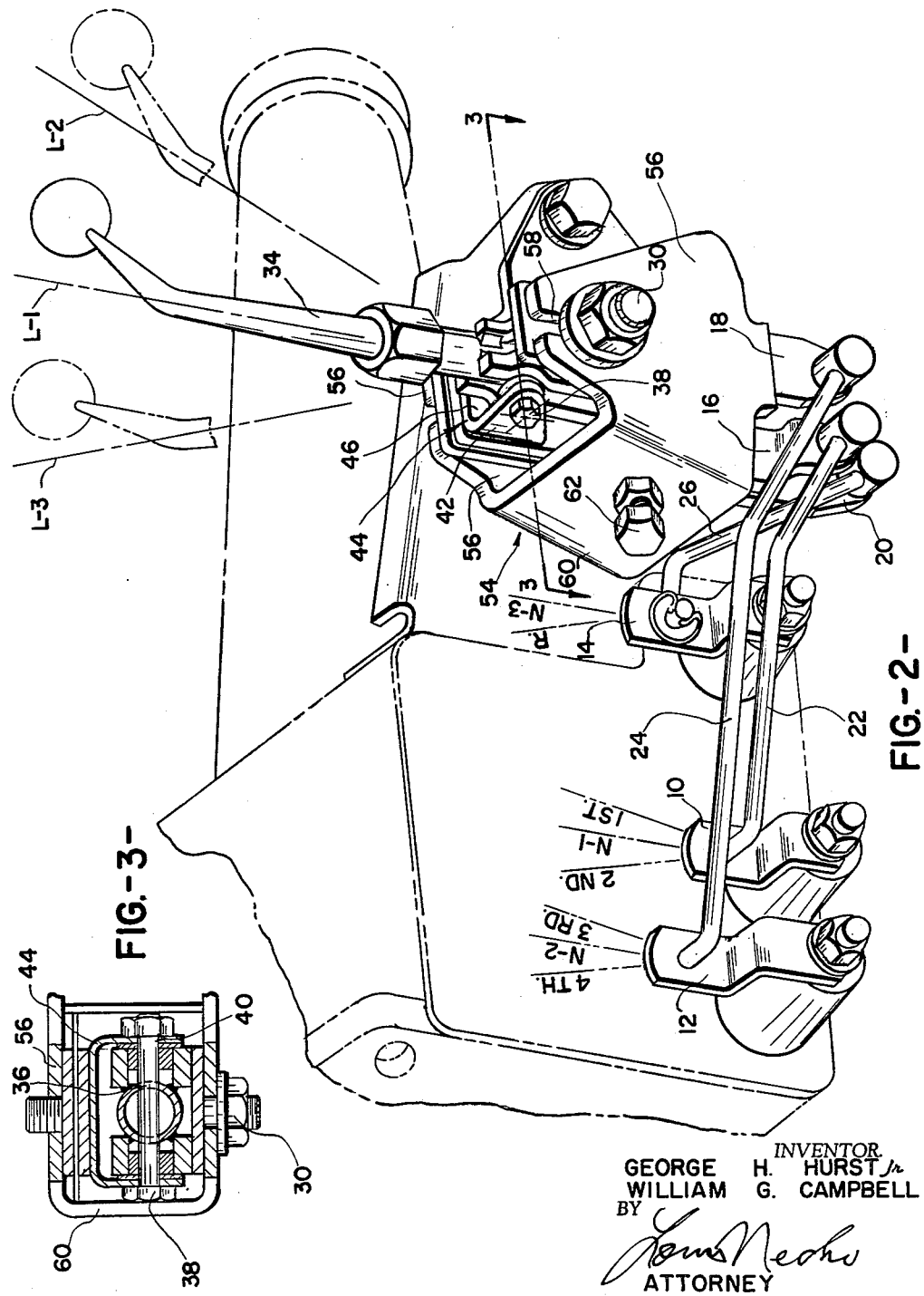

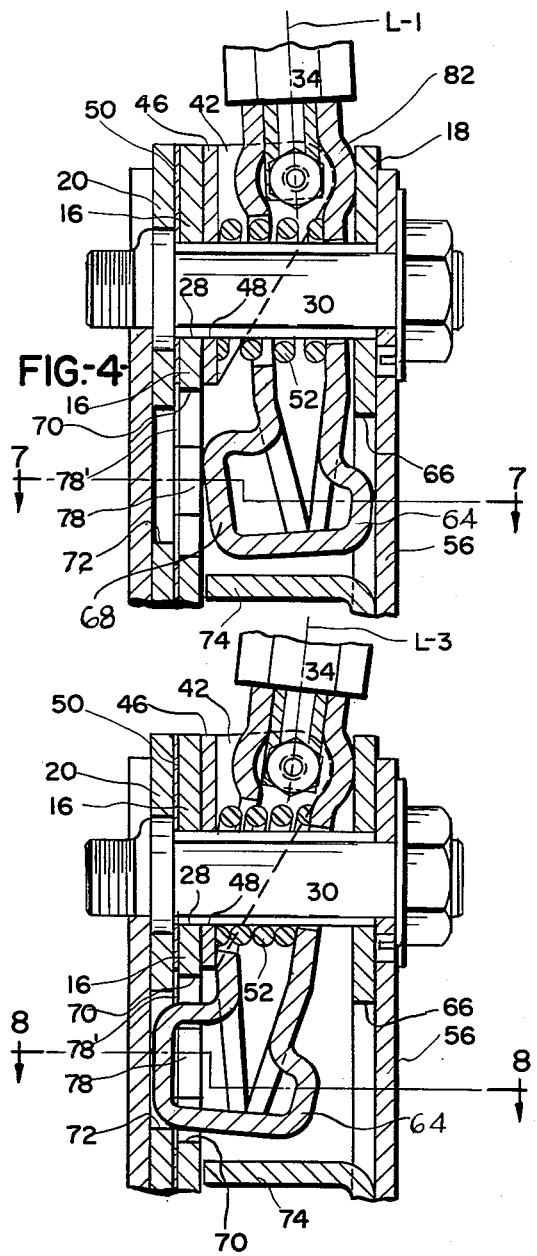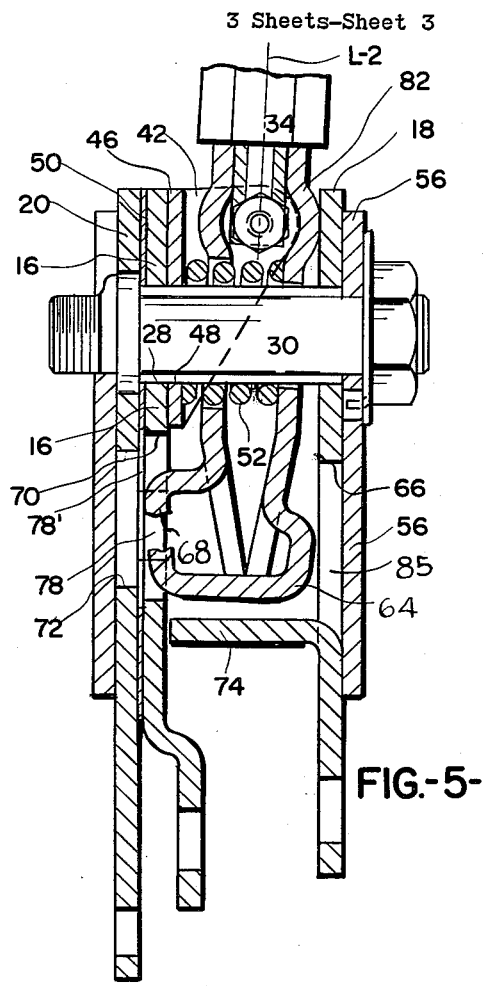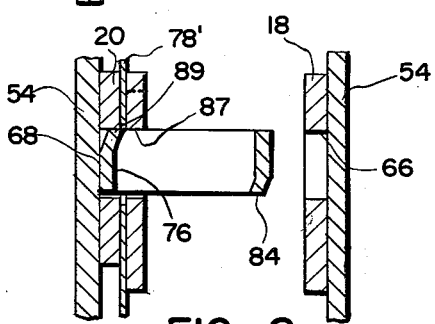

3,192,793
GEAR SHIFT
George H. Hurst, Jr., Abington, and William G. Campbell, Chalfont, Pa. (Both of 341 W. Glenside Ave., Glenside, Pa.)
Filed Mar. 18, 1964, Ser. No. 352,772
7 Claims. (Cl. 74—476)

This invention relates to a new and improved manually operable gear shift mechanism for use in connection with the transmission of an automotive vehicle or other engine.

One object of this invention is to produce an improved gear shift mechanism of the type set forth.

A further object is to produce a gear shift mechanism which eliminates, or minimizes, the possibility of unintended shifting from one speed to another, or from any of the forward speed positions to the reverse gear position.

A still further object of the invention is to produce an improved gear shift mechanism which is easily installed and easily removed with minimum interference with the conventional structure.

A still further object is to produce a durable and inexpensive gear shift mechanism.

The full nature of the invention will be understood from the following specification and accompanying drawings:

FIG. 1 is an exploded perspective view of a gear shift mechanism embodying the invention, some parts being broken away and other parts omitted.

FIG. 2 is a perspective view showing a gear shift mechanism assembled and mounted on the housing of an automotive transmission, the latter being shown in broken lines.

FIG. 3 is a sectional view looking in the direction of line 3—3 on FIG. 2.

FIG. 4 is a vertical sectional view of the gear shift mechanism with the transmission in neutral position and with the operating handle in a position to shift the transmission into third, or into fourth, forward speed gear ratio.

FIG. 5 is similar to FIG. 4 but shows the operating handle in a position to shift the transmission to first, or to second forward speed gear ratios.

FIG. 6 is similar to FIGS. 4 and 5 but shows the operating handle in a position to shift the transmission into reverse gear.

FIG. 7 is a sectional view looking in the direction of line 7—7 on FIG. 4.

FIG. 8 is a sectional view looking in the direction of line 8—8 on FIG. 6.

In the various views, like reference numerals designate like parts.

A manually operable four forward-speed transmission includes a first gear train actuating lever 10 which has a neutral position N–1, and which is movable to a first position to shift the transmission into first, forward-speed gear and is movable to a second position in which it shifts the transmission into second, forward-speed gear; a second gear train actuating lever 12 which has a neutral position N–2, and which is movable to a first position to shift the transmission into third, forward-speed gear, and is movable to a second position to shift the transmission into fourth forward-speed gear, and a third gear train actuating lever 14 which has a neutral position, N–3, and which is movable to one position in which it shifts the transmission into reverse gear. In FIG. 2, levers 10, 12 and 14 are shown, in solid lines, in their neutral positions and their movements to their gear shifting positions are indicated by broken lines. The manner in which movement of levers 10, 12 and 14 shift the gear trains is conventional and is, therefore, not shown nor described.

It is enough to note that levers 10, 12 and 14 are moved to their various positions by selector plates 16, 18 and 20, to which they are operatively connected by adjustable tie rods 22, 24 and 26, respectively, that selector plates 16, 18 and 20 also have vertical neutral positions corresponding to the neutral positions of actuating levers 10, 12 and 14, and that they are movable in one direction, or the other, to move the gear train actuating levers to their respective positions. Selector plates 16, 18 and 20 are provided with aligning holes 28 for the passage therethrough of assembly bolt 30 which also passes through opening 32 formed in one side 33 of the lower portion of operating handle 34 and through a smaller opening 35 in the other side 37 of said lower handle portion whereby the selector plates and the operating handle are rotatable about the axis of assembly bolt 30. It should be noted that even the smaller opening 35 is large enough to permit operating handle 34 to rock in the direction of the axis of bolt 30 as generally indicated by broken lines L–1, L–2 and L–3 which are hereinafter further referred to. Handle 34 is also provided with a through hole 36 for the passage of pin 38 which also passes through registering holes 40 in the limbs 42 of an assembly U-shaped bracket 44 the bight portion 46 of which is provided with a hole 48 for the passage therethrough of assembly bolt 30 whereby assembly bracket 44 is also rotatable about the axis of the assembly bolt. Assembly bolt 30 also fixedly carries an "interlock" plate 50 which is hereinafter further referred to.

The parts above referred to are assembled on bolt 30 in the order shown in FIGS. 4 to 6 and are tensioned against unintended movement by a spring 52 which abuts the bight portion 46 of U-shaped bracket 44 and passes through the large end of tapered opening 32 in handle 34 to abut the distal side of the handle so as to bias the handle to the position of broken line L–1.

The assembled shifting mechanism is carried by a U-shaped mounting bracket 54 the limbs 56 of which have U-shaped recesses 58 for receiving assembly bolt 30 as best shown in FIGS. 1 and 2. Mounting bracket 54 is suitably secured to the transmission housing and its bight portion 60 is provided with a set screw which is hereinafter referred to.

Below assembly bolt 30 the handle is provided with a first engaging portion 64, which is engageable with opening 66 in third and fourth gear selector plate 18, and with an opposite second engaging portion 68 which is engageable with opening 70 in first and second gear selector plate 16 or with opening 72 in reverse gear selector plate 20. As can be seen from FIGS. 4 to 6, opening 66 is formed by striking out tongue 74 which is bent as shown so as to abut selector plate 16 to keep selector plate 18 parallel with selector plate 16 and 20. Engaging portions 64 and 68 may be made of sheet metal of sufficient rigidity and at least engaging portion 68 is made in the form of a loop, or it is provided with an opening 76 for the passage therethrough of tongue 78 which projects into opening 70 in selector plate 16. Interlock plate 50 which is fixed on bolt 30 is provided with an opening 80 which registers with openings 70 and 72 and in plates 16 and 20 only when said plates are in neutral position. This is due to the fact that, when the transmission is in neutral position, selector plates 16, 18 and 20 will all be vertically disposed, and in alignment with each other and with interlock plate 50 and that openings 66, 70, and 72 will be in alignment and with opening 80. When any of selector plates 16, 18 or 20 is moved out of neutral position, its opening ceases to align with the openings in the other selector plates, or the opening in the interlock plate. Interlock plate 50 is provided with a tongue 78′ which is identical with tongue 78 whereby engaging portion 68 must clear the interlocking plate before it can enter opening 72 in reverse gear selector plate 20. In other words, tongue 78' makes it impossible for engaging portion 68 to bridge, or straddle selector plates 16 and 20 and therefore prevents simultaneous movement of actuating plates 10 and 14.

The operation is as follows:

With the parts assembled as shown, and with the transmission in neutral position, spring 52 will urge handle 34 to the position of FIG. 4 in which engaging portion 64 enters opening 66 in third and fourth gear selector plate 18. In this position of the parts, handle 34 is in the position of line L–1 in FIG. 4 and, if the handle is moved to, or fro, or transversely of the axis of bolt 30, selector plate 18 will move actuating lever 12 to third, or to fourth gear position. It will be noted that dome 82 on handle 34 always bears against the upper end of selector plate 18.

If it is desired to shift the transmission to first, or to second gear, handle 34 is moved to the position of broken line L–2 of FIG. 5 in which engaging portion 68 enters opening 70 in selector plate 16 whereby to and fro movement of the handle 34, or transversely of bolt 30, will move selector plate 16 and, hence, gear train actuating lever 10 to first, or to second gear position according to the direction of movement of the operating handle. It will be noted that movement of operating handle 34 to the position of line L–2 partly compresses spring 52 thus providing a measure of resistance which must be overcome and which lets the driver know that he is moving the operating handle into first, or second, gear position. If the operator wishes to go into reverse gear, operating handle 34 is moved to the position of broken line L–3 in FIG. 6 in which engaging portion 68 moves into opening 72 in reverse gear selector plate 20 whereby movement of the operating handle transversely of bolt 30 moves gear train actuating lever 14 from the neutral position to the reverse gear position.

It will be noted that the width of engaging portion 64 is only slightly less than the width of opening 66 so that, when the parts are in the position of FIG. 4, the opposite vertical edges 84 of engaging portion 64 will align with and be very close to the vertical walls 85 of opening 66 whereby movement of handle 34 about the axis of bolt 30 will move selector plate 18. It will also be noted that, when engaging portion 68 enters opening 70 in selector plate 16, its vertical edges 86 will be between the vertical edge 87 of tongue 78 and the juxtaposed vertical wall 88 of opening 70 so that movement of handle 34 will move selector plate 16 and hence gear train actuating lever 10. To shift the transmission into reverse gear, handle 34 is moved to the position of line L–3 in FIG. 5 in which engaging portion 68 clears tongues 78 and 78' and enters opening 72 in reverse selector plate 20 which is connected to and operates train actuating lever 14. In this position, the vertical edges of engaging portion 68 will engage the opposite vertical walls 89 of opening 72 whereby movement of handle 34 transversely of bolt 30 will move lever 14 reverse gear train engaging position or back, as the case may be.

It will be noted that spring 52 must be substantially fully compressed before engaging portion 68 can enter opening 72. This presents a further and greater measure of resistance which must be overcome and serves to alert the driver that he is shifting into reverse. In addition to this warning, tongue 78' in fixed interlock plate 50, will prevent engaging portion 68 from entering opening 72 in reverse gear selector plate 20 until said engaging portion has cleared said tongue. Since this can not happen unless opening 66 in first and second gear selector plate 16 is in perfect alignment with opening 80 in interlock plate 50, it follows that it is impossible to shift into reverse gear until the transmission has been brought to its neutral position.

Since openings 70, 72 and 80 are in alignment only when first and second and reverse gear selector plates 16 and 20 are in the neutral position, it follows that operating handle 34, and, hence, the transmission, must be in full neutral position before the operating handle can be engaged with reverse selector plate 20.

Drivers using manual operated gear shifting mechanism tend to ram handle 34 home with excessive force which can cause the gear trains to over-ride their respective positions with consequent damage to the gears, or can distort connecting rods 22, 24, or 26. To prevent this, we provide set screw 62 which can be adjusted so as to limit movement of handle 34 in one direction, it being understood that similar, and oppositely disposed set screw, not shown, limits the movement of handle 34 in the opposite direction.

What we claim is:

1. A gear shifting mechanism for a transmission, said mechanism including a first gear selector plate movable to a first position to shift the transmission to first gear and movable to a second position to shift the transmission to second gear, a second gear selector plate movable to a first position to shift the transmission to third gear and movable to a second position to shift the transmission to fourth gear, an operating handle for selectively engaging and actuating said selector plates, said handle comprising an upper portion and a lower portion, mounting means pivotally mounting said selector plates and the upper portion of said handle for rotation about a common axis with said handle between said plates, the lower portion of said operating handle being bulged out to provide integral, relatively large first and second-engaging portions projecting from the opposite sides thereof, respectively, said first and second selector plates having first and second openings therein engageable with said first and second engaging portions, respectively, selectively to integrate said handle with either of said plates, said handle and said selector plates having a neutral position in which said first and second engaging portions register with said first and said second openings, respectively, biasing means normally biasing said operating handle from said neutral position, to engage said second engaging portion with said second opening in said second selector plate, whereby movement of said handle transversely of said axis will shift the transmission from neutral to third, or to fourth gear according to the movement of said handle, and a third gear selector plate having a neutral position and movable to a position to shift the transmission into reverse gear, said third plate being located adjacent the face of said first selector plate remote from said first engaging portion, said third selector plate having a third opening therein for receiving said first engaging portion after said first engaging portion has passed through said first opening in said first selector plate.

2. The mechanism defined in claim 1 and lock out means for preventing the entry of said first engaging portion into said third opening unless said first and said third selector plates are in neutral position and said first and third openings are in registration with each other.

3. The mechanism defined in claim 2 in which said lock out means is a fourth plate fixed on said axis and having a fourth opening therein which registers with said first and third opening, only when said first and third plates are in their neutral position whereby said first engaging portion can not enter said third opening unless said first and third plates are in their neutral position and said first, third and fourth openings are in alignment.

4. The mechanism defined in claim 1 and a tongue projecting into said first opening and having a vertical edge engageable with a vertical edge of said first engaging portion, said first engaging portion having a fourth opening therein larger than said tongue, whereby movement of first engaging portion into engagement with said third opening will not move said first selector plate.

5. A gear shifting mechanism for a transmission including a first gear selector plate having a neutral position and movable to a first position to shift said transmission to first gear and movable to a second position to shift said transmission to second gear, a second gear selector plate having a neutral position and movable to a first position to shift said transmission to third gear and movable to a second position to shift said transmission to fourth gear position, a third gear selector plate having a neutral position and located adjacent said second selector plate, said third plate being movable to shift said transmission to reverse gear, there being a first opening in said first plate, a second opening in said second plate and a third opening in said third plate, all of said openings being in registration when said plates are in their respective neutral positions, an operating handle, mounting means pivotally mounting said operating handle between said first and second selector plates, a first engaging portion at the lower end of said handle and movable into and out of said first opening to integrate said handle with said first plate, a second engaging portion at the lower end of said handle and movable into said second opening to integrate said handle with said second plate, said second engaging portion being also movable through said second opening into said third opening to integrate said handle with said third selector plate, and said biasing means normally biasing said operating handle toward said second selector plate.

6. The mechanism defined in claim 5 and a fourth, fixed, plate between first and third selector plates and having a fourth opening therein through which said first engaging portion must pass in moving from said first to said third opening, said fourth opening registering with said first and third openings only when said first and third selector plates are in their neutral positions.

7. A gear shifting mechanism for a transmission, said mechanism including, an outer, U-shaped mounting bracket, an assembly shaft passing through the opposite walls thereof, a first gear selector plate mounted on said shaft and movable to a first position to shift the transmission to first gear and movable to a second position to shift the transmission to second gear, a second gear selector plate mounted on said shaft and movable to a first position to shift the transmission to third gear and movable to a second position to shift the transmission to fourth gear, an operating handle mounted for rotation about the axis of said shaft and for rocking movement in the direction of the axis of said shaft, said handle including a lower portion below the axis of said shaft and an upper portion above the axis of said shaft, said first and second selector plates having first and second openings therein, first and second engaging portions carried by said lower portion of said handle and selectively engageable with said openings to integrate said handle with either of said plates, said handle and said selector plates having a neutral position in which said first and second engaging portions register with said first and said second openings, respectively, an inner U-shaped bracket disposed with its side walls within and parallel to the intermediate wall of said outer bracket and with its intermediate wall abutting one side wall of said outer bracket there being an opening in the intermediate wall of said inner U-shaped bracket through which said shaft passes, there also being registering holes in the side walls of said inner U-shaped bracket and through said handle, a pin passing through said holes with its axis above and normal to the axis of said shaft, and biasing means bearing against said handle and against normally biasing said handle in a direction to engage said second engaging portion with said second opening in said second selector plate, whereby movement of said handle transversely of the axis of said shaft will shift the transmission from neutral to third, or to fourth gear according to the movement of said handle.

References Cited by the Examiner
UNITED STATES PATENTS

| | | | |
|---|---|---|---|
| 1,736,330 | 11/29 | Schmidt | 74—473 |
| 2,922,315 | 1/60 | Primeau | 74—473 |
| 3,052,135 | 9/62 | Hurst et al. | 74—473 |
| 3,082,638 | 3/63 | Nilson | 74—473 |
| 3,082,639 | 3/63 | Almquist | 74—473 |
| 3,088,329 | 5/63 | Merritt | 74—473 |

BROUGHTON G. DURHAM, *Primary Examiner.*

MILTON KAUFMAN, *Examiner.*

UNITED STATES PATENT OFFICE
CERTIFICATE OF CORRECTION

Patent No. 3,192,793　　　　　　　　　　　　　　　July 6, 1965

George H. Hurst, Jr., et al.

It is certified that error appears in the above identified patent and that said Letters Patent are hereby corrected as shown below:

Column 2, line 2, "18", first occurrence, should read -- 16 --. Column 5, line 5, "second" should read -- first --; line 18, "second", second occurrence, should read -- first --; line 19, "second" should read -- first --.

Signed and sealed this 1st day of September 1970.

(SEAL)
Attest:

Edward M. Fletcher, Jr.　　　　　　　　　WILLIAM E. SCHUYLER, JR.
Attesting Officer　　　　　　　　　　　　　　　Commissioner of Patents